Aug. 6, 1935.  F. WINKLER  2,010,248

CHANGE SPEED GEAR FOR BICYCLES

Filed Jan. 17, 1935  2 Sheets-Sheet 1

Inventor

Franz Winkler per

Dean Fairbank Hirsch & Foster his Attorneys

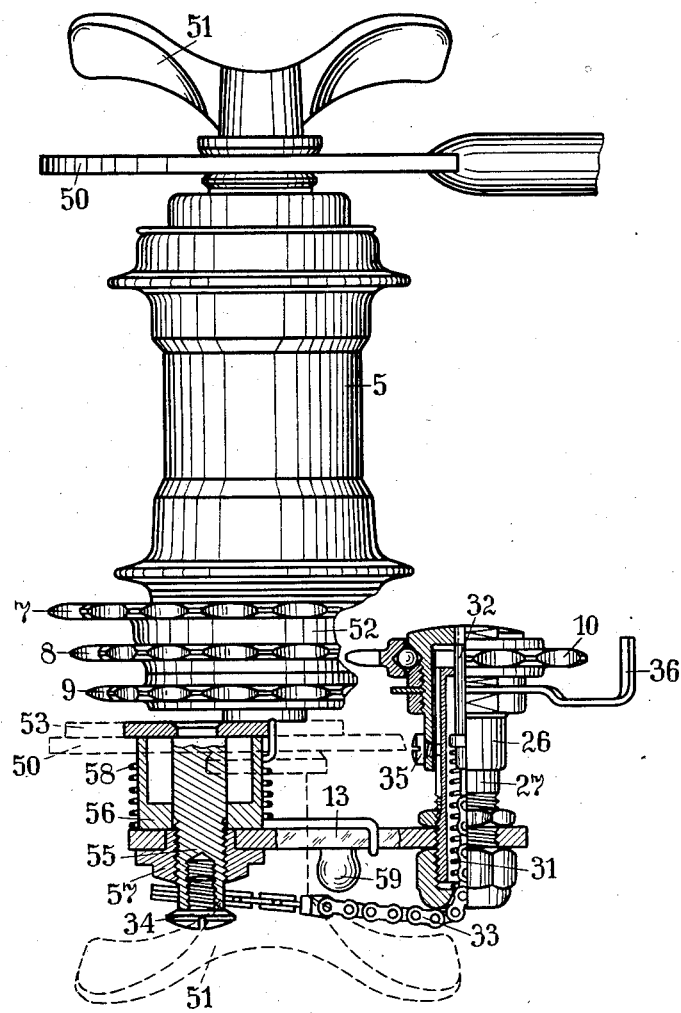

Patented Aug. 6, 1935

2,010,248

UNITED STATES PATENT OFFICE 2,010,248

CHANGE SPEED GEAR FOR BICYCLES

Franz Winkler, Schweinfurt, Germany

Application January 17, 1935, Serial No. 2,214
In Germany January 27, 1934

8 Claims. (Cl. 208—153)

The invention relates to change speed gears for vehicles, especially bicycles in which a plurality of sprocket wheels is provided on the driven rear wheel of the bicycle to which wheel the drive is transmitted from the cranks or a motor by means of the usual chain. The sprocket wheels having different diameters variable speed is obtained when the chain is placed on one or another of same. The transmission of the chain from one sprocket to another is performed by means of a guide wheel mounted axially displaceable parallel with the axis of the driven wheel on a chain-tightening appliance, composed of a pivotal arm and a spring pressing same on the chain, a chain-shifting wheel being mounted on the free end of the said pivotal arm.

The invention more particularly resides in the special construction and disposition of the said pivotal supporting arm and means for actuating it and the co-acting parts provided for displacing the guide wheel.

The object of the invention is to get all chain-adjusting means assembled on a single pivot pin and in such an arrangement as to allow the driven wheel being removed from the frame without requiring displacement of any of the controlling parts.

This object is attained by locating a pivot and guide bolt on a projection depending from the end of the rear fork of the bicycle, the said bolt constituting the bearer of the chain-tightening arm and its operating spring while the Bowden chain is turned around the bolt. By this interconnection the main controlling parts form a compact unit placed near the frame of the bicycle and protected from being damaged or thrown into disorder.

Other objects will appear in the following detailed description and their practical advantages will be disclosed in connection therewith.

In the accompanying drawings, which form a part of this specification, an embodiment of the invention is illustrated by way of example.

Fig. 2 is a top plan view, several parts of the shifting device being shown in section.

Figure 1:
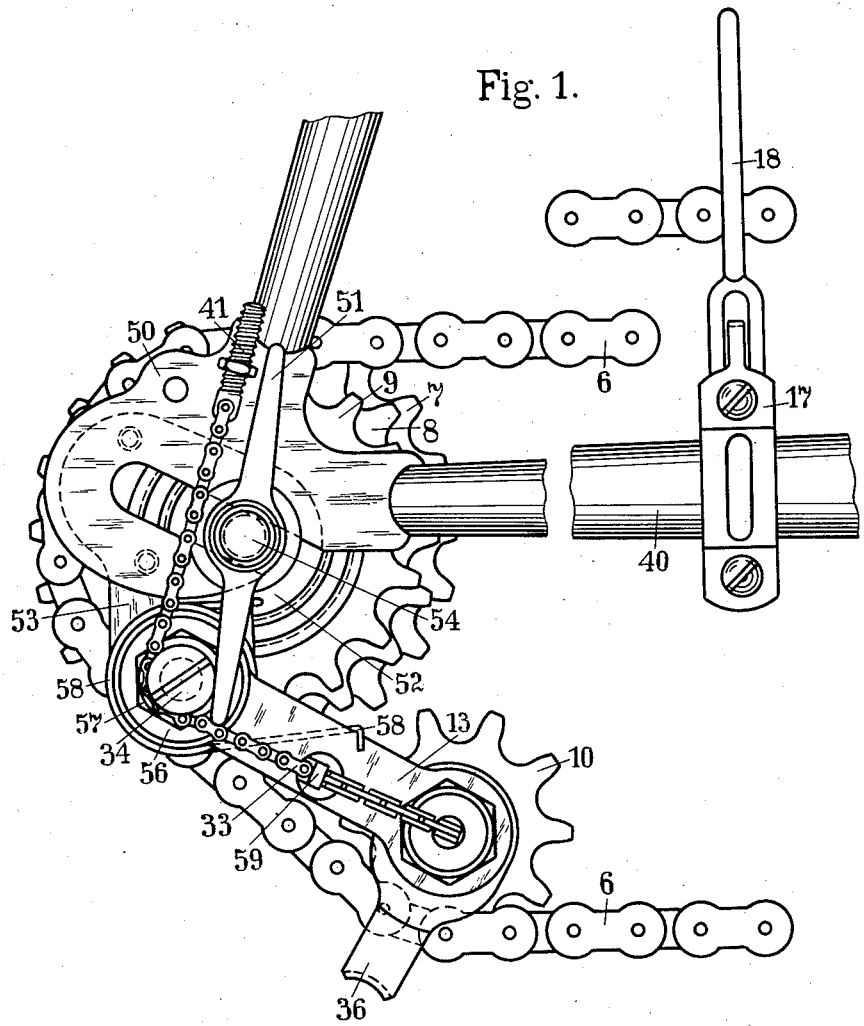
Fig. 1 is an elevation of the device and some parts of the cycle.

Referring to the drawings, the free-wheel coaster-hub 5 the driver 52 of which is provided with three sprocket wheels 7, 8, 9 of different diameters and rigidly fastened thereto, is mounted in the usual way with its axle 54 in the slots of the rear fork ends 50 of the cycle by means of wing nuts 51.

It is desirable that the rockable carrier of the chain-tightening wheel 10, which carrier, in the form shown, is a lever 13, be pivoted at one end 50 of the said fork, and suitably adapted to the cycle. To permit this a strap 53 is, in the embodiment shown, fastened on the inside of the fork end 50 by rivets or in another suitable manner, and provided with a slot registering with the slot in the said fork end 50 so that the wheel axle 54 can be adjusted in a correct way. The strap 53 has an extension projecting downwards beyond the fork end and into which a pin 55 is riveted or rigidly fastened in another suitable manner. On this pin is mounted a hollow drum 56 which is pressed against the said strap by a flanged ring 57 screwed on the free end of the pin 55. Between the flange of the ring 57 and the end face of a cap or drum 56 there is rockably mounted the lever 13 with its eye. A helical spring 58 encircling the said drum and the hooked ends of which engage the said strap and the lever 13 respectively tends to press the lever 13 downwards. In the eye provided for in the free end of the lever 13 there is fastened a sleeve 27 by means of nuts bearing against either side of the lever 13. This sleeve carries a cap 26 slidably mounted thereon but prevented from turning by a screw 35 the end of which is guided in a longitudinal slot of the said sleeve 27. On the cap 26 there is mounted by means of a ball bearing so as to rotate smoothly the sprocket wheel 10 intended for shifting the chain. To the cap 26 is further secured a guide rod 32 against the collar of which bears a spring 31 which tends to displace the said sprocket wheel in one direction, viz. towards the interior of the frame. To the other end of the guide rod 32 is fastened a traction element or device in the form of a chain 33 which extends from the interior of the said sleeve and is placed around the free end of the pin 55 so as to extend upwards. The wide head of a screw 34 screwed into the free end of the said pin 55 serves the purpose of better guiding the said chain 33. To the chain is finally connected any well known and suitable means for pulling it, such as the so-called Bowden wire or a traction rodding 41 by means of which the driver can accomplish the shifting operation which is done by the shifting wheel 10 being displaced parallel with the axis of the free-wheel hub. In order that the spring 31 is prevented from pushing the cap 26 off the sleeve 27 when the device is being mounted or repaired, the lever 13 is provided with a stop 59 where the chain 33 is hooked on in case the traction rodding 41 is detached.

The driving chain 6 intended for transmitting the movement from the sprocket wheel mounted on the crank axle to the rear wheel runs through a fork-shaped guide 18 secured by means of a clip 17 to one tube of the rear fork, then to one of the sprocket wheels 7, 8 or 9 and subsequently over the shifting wheel 10 back to the driving wheel. Below the shifting wheel there is also disposed a chain guiding yoke 36.

The device works as follows: The shifting wheel 10 having been adjusted in the plane of the sprocket wheel 8 and being now pressed downwards by the lever 13 tightens the chain, as is obvious from Fig. 1. When by means of the shifting, wheel 10 is adjusted into the plane of the sprocket wheel 9 it at the same time draws the driving chain sidewise which thus jumps from the sprocket wheel 8 upon the sprocket wheel 9. The reduction of the circumferential length on the sprocket wheel now driven is compensated for by another position of the tightening lever 13. When on the other hand the rodding 41 is released, the spring 31 acting on the rod 32 will position the shifting wheel 10 in the plane of the sprocket wheel 7 so that the driving chain 6 is caused to run thereon.

The bolt 55 is laterally supported by the cap 56, while the spring 58 and the traction chain 33 are guided by the bolt and protected from disengagement by rigid parts, such as the bolt itself, the arm 13 and the wings of the nut 51.

In case there is a necessity of removing the rear wheel from its fork, the driving chain will be supported by the fork 18 and the guide 36.

I claim—

1. In a change speed gear for bicycles of the kind described, the combination with a wheel hub, of a plurality of sprocket wheels mounted thereon, the sprocket wheels having different diameters, a driving chain, a fulcrum pin interconnected with the end piece of the rear fork of the bicycle, a chain-tightening arm rockable about said fulcrum pin, a spring surrounding the said fulcrum pin and acting upon the chain-tightening arm, a chain-shifting wheel placed on the free end of said arm, and a traction-device turned round the said fulcrum pin.

2. In a change speed gear for bicycles, composed of a plurality of sprocket wheels attached to a vehicle wheel, a driving chain, a chain-tightening rockable arm, and means for shifting the chain from one sprocket wheel to the adjacent one, the combination of a pivot pin attached to the fork end of the bicycle and adapted to support and guide the chain-tightening and shifting means, and a traction element turned around the outer end of the pivot pin.

3. In a change speed gear for bicycles, the combination with a plurality of sprocket wheels with different diameters, said sprocket wheels being mounted on a wheel of the vehicle, of a driving chain capable of being alternately placed on any of said sprocket wheels, a pivot pin attached to the end of the vehicle fork, a rockable chain-tightening arm, a spring acting on the arm and a traction element, all being engaged with said pivot pin, shiftable means mounted on the free end of said rockable arm, and a chain-shifting wheel supported by the shiftable means.

4. In a change speed gear for bicycles, the combination with a plurality of sprocket wheels with different diameters and mounted on the vehicle wheel, of a driving chain capable of being alternately placed on any of said sprocket wheels, a rockable chain-tightening arm, a spring pressing the said arm to the driving chain, a traction element, a pivot pin supporting and guiding the said chain, spring and traction element, chain-shifting means mounted on the free end of the rockable arm, and a stop on the chain tightening arm adapted to receive the traction element for arresting same.

5. In a change speed gear for bicycles, the combination with a plurality of sprocket wheels with different diameters and mounted on the vehicle wheel, of a driving chain capable of being alternately placed on any of the sprocket wheels, a pivot pin provided on the end piece of the bicycle frame, a chain-tightening arm pivotally mounted on said pivot pin, a spring acting upon said chain-tightening arm, a guide wheel engaging the driving chain, a guide wheel support mounted on the free end of the chain-tightening arm and being extensible parallel with the axis of the sprocket wheels, and a traction element attached to the said guide wheel support and being turned round a guide groove of the pivot pin.

6. In a change speed gear for bicycles, the combination with a plurality of sprocket wheels with different diameters, said sprocket wheels being mounted on a wheel of the vehicle, of a driving chain capable of being alternately placed on any of said sprocket wheels, a pivot pin attached to the end of the vehicle fork, a rockable chain-tightening arm, a cap encircling the pivot pin, a spring mounted on said cap and acting on the said arm, a chain-shifting device attached to the outer end of said arm, a guide wheel mounted on said shifting device and engaged with the driving chain, and a traction element attached to the chain-shifting device and turned around the said pivot pin.

7. In a change speed gear for bicycles, the combination with a plurality of sprocket wheels with different diameters, said sprocket wheels being mounted on a wheel of the vehicle, of a driving chain capable of being alternately placed on any of said sprocket wheels, a pivot pin attached to the end of the vehicle fork, a rockable chain-tightening arm, a cap encircling the pivot pin, a spring mounted on said cap and acting on the said arm, a chain-shifting device attached to the outer end of said arm, a guide wheel mounted on said shifting device and engaged with the driving chain, a traction element attached to the chain-shifting device and turned around the said pivot pin, and guide means for the chain located on the vehicle frame and the free end of the chain-tightening arm and adapted to secure the driving chain in proper position when the vehicle wheel is removed.

8. In a change speed gear for bicycles, the combination with a free-wheel hub, of a driver therefor, a plurality of sprocket wheels fixed to the driver and having different diameters, a driving chain capable of being alternately placed on any of said sprocket wheels, of a bracket fixed to the rear end of the fork of the vehicle, a pivot pin fixed on the downward projecting part of said bracket, a cap surrounding the pivot pin, a nut screwed on the pivot pin forcing the cap to the bracket, a chain-tightening arm rockable about said pivot pin, a spring mounted on the cap and acting on said chain-tightening arm, a chain-shifting device mounted on the outer end of the said arm, a guide-wheel rotatable about the said chain-shifting device and being in engagement with the chain, a flexible traction element attached to the chain shifting device and turned around the pivot pin, and means for independently fixing the free-wheel hub in the fork.

FRANZ WINKLER.